US012027037B1

(12) United States Patent
Carter et al.

(10) Patent No.: US 12,027,037 B1
(45) Date of Patent: *Jul. 2, 2024

(54) EMERGENCY MEDICAL SERVICES (EMS) VISUAL LIGHT GUIDANCE AIDING DEVICE TO GUIDE EMS TO A SPECIFIC LOCATION

(71) Applicants: Michael Anson Carter, Sim Valley, CA (US); Marcella Karina Carter, Sim Valley, CA (US)

(72) Inventors: Michael Anson Carter, Sim Valley, CA (US); Marcella Karina Carter, Sim Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,830

(22) Filed: Oct. 31, 2023

Related U.S. Application Data

(63) Continuation of application No. 18/129,622, filed on Mar. 31, 2023, now Pat. No. 11,854,375.

(60) Provisional application No. 63/326,195, filed on Mar. 31, 2022.

(51) Int. Cl.

| | |
|---|---|
| ***G08B 5/00*** | (2006.01) |
| ***F21S 9/02*** | (2006.01) |
| ***G08B 5/38*** | (2006.01) |
| ***G08B 25/01*** | (2006.01) |

(52) U.S. Cl.
CPC .............. *G08B 5/002* (2013.01); *F21S 9/022* (2013.01); *G08B 5/38* (2013.01); *G08B 25/016* (2013.01)

(58) Field of Classification Search
CPC ...................................................... G08B 5/002
See application file for complete search history.

(56) References Cited

U.S. PATENT DOCUMENTS

| | | | | |
|---|---|---|---|---|
| 8,970,933 | B2 * | 3/2015 | Sasaki | H02P 8/22 359/221.3 |
| 11,854,375 | B1 * | 12/2023 | Carter | G08B 7/066 |
| 2016/0366754 | A1 * | 12/2016 | Villaume | H05B 45/20 |
| 2017/0365136 | A1 * | 12/2017 | Torre Sarmiento | F21V 31/005 |
| 2022/0237994 | A1 * | 7/2022 | Wesley | F21V 23/0435 |

* cited by examiner

*Primary Examiner* — Travis R Hunnings

(74) *Attorney, Agent, or Firm* — Plager Schack LLP; Mark H. Plager; Stephen Hallberg

(57) ABSTRACT

An emergency medical services (EMS) visual light guidance aiding device is disclosed. The EMS visual light guidance aiding device is configured to aid EMS personnel in guidance to a specific location without maps, apps, or other conventional guidance mechanisms.

8 Claims, 5 Drawing Sheets

EMERGENCY MEDICAL SERVICES (EMS) VISUAL LIGHT GUIDANCE AIDING DEVICE TO GUIDE EMS TO A SPECIFIC LOCATION

CLAIM OF BENEFIT TO PRIOR APPLICATIONS

This application is a continuation of and claims benefit to U.S. Non-Provisional patent application Ser. No. 18/129,622, entitled "AN EMERGENCY MEDICAL SERVICES (EMS) VISUAL LIGHT GUIDANCE AIDING DEVICE TO GUIDE EMS TO A SPECIFIC LOCATION," filed Mar. 30, 2023. The U.S. Non-Provisional patent application Ser. No. 18/129,622 is incorporated herein by reference.

BACKGROUND

Embodiments of the invention described in this specification relate generally to guidance systems and devices, and more particularly, to an emergency medical services (EMS) visual light guidance aiding device to aid EMS personnel in guidance to a specific location without maps, apps, or other conventional guidance mechanisms.

Some people need guidance to get to locations in fast order. Emergency medical services (EMS) personnel typically need to be able to get to any location where an emergency situation is unfolding. However, typically EMS relies on addresses and mapping systems that may or may not find routes to a location. This makes current guidance systems undependable for use by EMS.

Therefore, what is needed is a location guidance mechanism that eliminates difficulty locating emergency scenes via address and/or location.

BRIEF DESCRIPTION

A novel emergency medical services (EMS) visual light guidance aiding device is disclosed. In some embodiments, the EMS visual light guidance aiding device is configured to aid EMS personnel in guidance to a specific location without maps, apps, or other conventional guidance mechanisms.

In one embodiment, the EMS visual light guidance aiding device is a fixed-location EMS visual light guidance aiding device. In an alternate embodiment, the EMS visual light guidance aiding device is a mobile, wearable EMS visual light guidance aiding device.

In some embodiments, the fixed-location EMS visual light guidance aiding device comprises a domed light housing with a plurality of individual light domes, a plurality of high-intensity lights in which each high-intensity light is enclosed within an individual light dome of the domed light housing, a plurality of hanger holes, an embedded communication device, an embedded application-enabled electronic system controller, a plurality of audible alarms, a plurality of strobe lights, a strong magnet, a pair of adhesive pads, an embedded battery, and a manual activation button. Instead of the battery, the fixed-location EMS visual light guidance aiding device of some embodiments is powered by a power line connection to a wall socket of the residence. In some embodiments, the fixed-location EMS visual light guidance aiding device is communicably connected, via the communication device, to a cloud server that hosts a cloud application service. In some embodiments, the cloud server and the cloud application service are operated by emergency services or another entity which, upon activation, notifies emergency services of an emergency situation at the fixed location of the EMS visual light guidance aiding device.

In some embodiments, the mobile, wearable EMS visual light guidance aiding device comprises a pair of straps that wrap around a body part of a user, a reflective front face surface, a strobe light, a plurality of high-intensity lights, a plurality of audible alarms, an embedded communication device, an embedded application-enabled electronic system controller, a battery, and a manual activation button. Also, the mobile, wearable EMS visual light guidance aiding device connects wirelessly to a cloud server which hosts a cloud application service, managed/operated by the emergency services or another entity.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
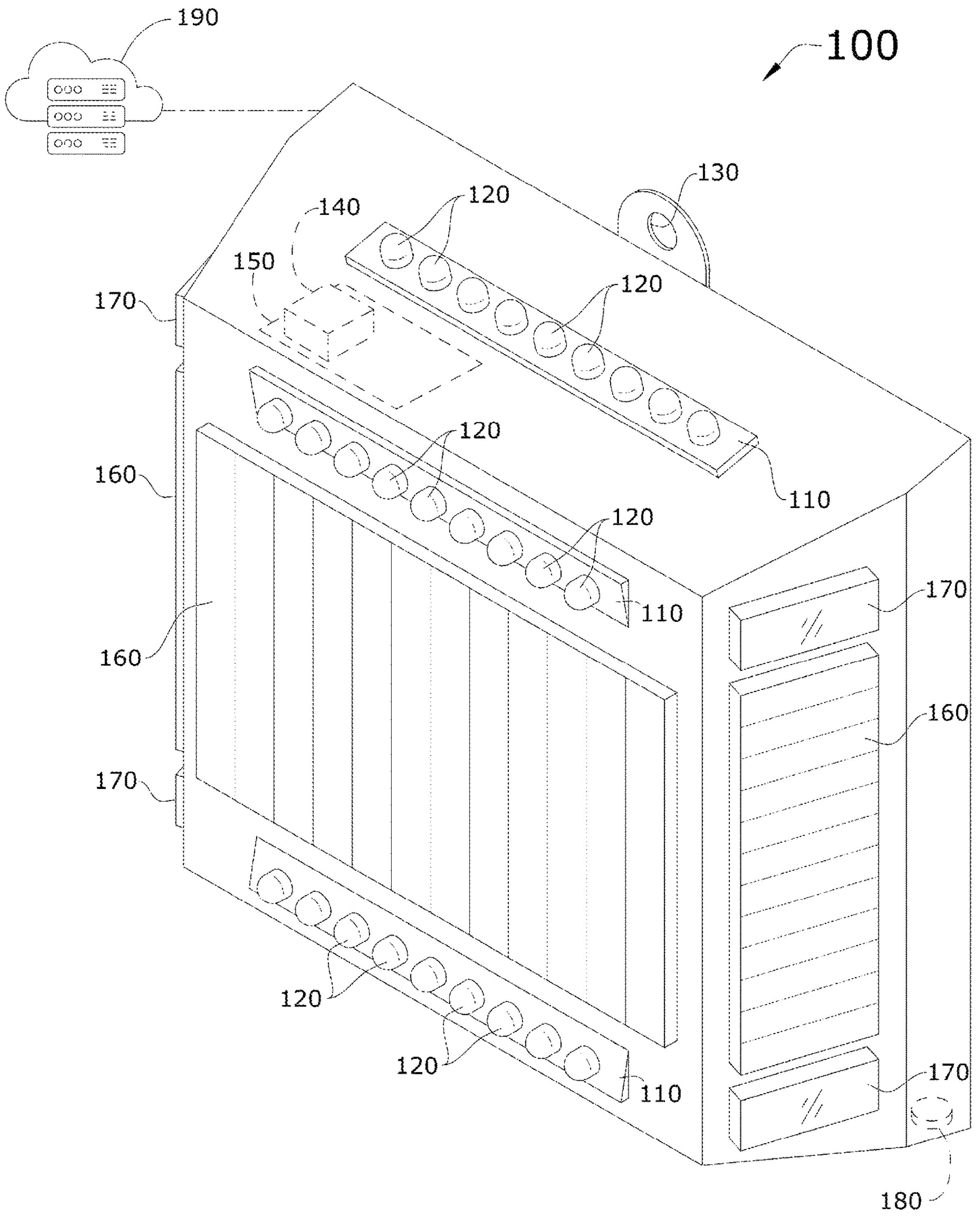
FIG. 1 conceptually illustrates a perspective view of a fixed-location EMS visual light guidance aiding device configured to provide guidance to a specific location in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a novel emergency medical services (EMS) visual light guidance aiding device to aid EMS personnel in guidance to a specific location without maps, apps, or other conventional guidance mechanisms.

In one embodiment, the EMS visual light guidance aiding device is a fixed-location EMS visual light guidance aiding device. In an alternate embodiment, the EMS visual light guidance aiding device is a mobile, wearable EMS visual light guidance aiding device.

In some embodiments, the fixed-location EMS visual light guidance aiding device comprises a domed light housing with a plurality of individual light domes, a plurality of high-intensity lights in which each high-intensity light is enclosed within an individual light dome of the domed light housing, a plurality of hanger holes, an embedded communication device, an embedded application-enabled electronic system controller, a plurality of audible alarms, a plurality of strobe lights, a strong magnet, a pair of adhesive pads, an embedded battery, and a manual activation button. Instead of the utilizing the embedded battery for power, the fixed-location EMS visual light guidance aiding device of some embodiments is powered by a wired power line connection to a wall socket of the residence. In some embodiments, the fixed-location EMS visual light guidance aiding device is communicably connected, via the communication device, to a cloud server that hosts a cloud application service. In some embodiments, the cloud server and the cloud application service are operated by emergency services or another entity which, upon activation, notifies emergency services of an emergency situation at the fixed location of the EMS visual light guidance aiding device. Examples of a fixed-location EMS visual light guidance aiding device are described below, by reference to FIGS. 1-2. Also, a process for using the fixed-location EMS visual light guidance aiding device is described further below, by reference to FIG. 3.

In some embodiments, the mobile, wearable EMS visual light guidance aiding device comprises a pair of straps that wrap around a body part of a user, a reflective front face surface, a strobe light, a plurality of high-intensity lights, a plurality of audible alarms, an embedded communication device, an embedded application-enabled electronic system controller, a battery, and a manual activation button. Also, the mobile, wearable EMS visual light guidance aiding device connects wirelessly to a cloud server which hosts a cloud application service, managed/operated by the emergency services or another entity. An example of a mobile, wearable EMS visual light guidance aiding device is described further below, by reference to FIG. 4.

As stated above, some people need guidance to get to locations in fast order. Emergency medical services (EMS) personnel typically need to be able to get to any location where an emergency situation is unfolding. However, typically EMS relies on addresses and mapping systems that may or may not find routes to a location. This makes current guidance systems undependable for use by EMS. Embodiments of the EMS visual light guidance aiding device described in this specification solve such problems by providing visual light signaling to locate and confirm emergency scenes and rescues by illuminating the specific location. In this way, the EMS visual light guidance aiding device eliminates arduous address searches and scene searches. Furthermore, the EMS visual light guidance aiding device is tied to mobile phone '911' app.

Embodiments of the EMS visual light guidance aiding device described in this specification differ from and improve upon currently existing options. In particular, currently nothing else exists like the EMS visual light guidance aiding device of the present disclosure. In addition, some embodiments of the EMS visual light guidance aiding device improve upon the currently existing lighting options by its ability to expand functionality by various applications, mobility and use in residences, apartment buildings, warehouses, industrial spaces and structures, boats, recreational vehicles (RVs), and other obscure or low light locations in which emergency scenes may occurs. Beyond these aspects, the EMS visual light guidance aiding device can be adapted for use as a wearable device, such as for hikers, skiers, etc.

The EMS visual light guidance aiding device of the present disclosure may be comprised of the following elements. This list of possible constituent elements is intended to be exemplary only and it is not intended that this list be used to limit the EMS visual light guidance aiding device of the present application to just these elements. Persons having ordinary skill in the art relevant to the present disclosure may understand there to be equivalent elements that may be substituted within the present disclosure without changing the essential function or operation of the EMS visual light guidance aiding device. For instance, different embodiments of the EMS visual light guidance aiding device with certain overlapping and/or non-overlapping elements are described below, by reference to FIGS. 1-2 and 4.

1. Plastic casing with rounded domes to house the lights (also referred to as the "domed light housing"). In some embodiments, one plastic casing houses lights along a top surface of the EMS visual light guidance aiding device and one or more other plastic casing(s) houses lights at a front face of EMS visual light guidance aiding device. In an alternate embodiments, a pair of plastic casings houses high-intensity lights and are positioned on a front face of a mobile, wearable EMS visual light guidance aiding device.
2. A plurality of high-intensity lights. In some embodiments, the plurality of high-intensity lights comprises at least two high-intensity laser lights.
3. A plurality of strobe lights. In some embodiments, the plurality of strobe lights comprises at least six and up to eight strobe lights. In an alternate embodiments, a single strobe light is centered on the front face of the mobile, wearable EMS visual light guidance aiding device.
4. A magnet.
5. A hook hanger.
6. An adhesive.
7. A battery tray/battery holder.
8. A communications and wireless data interface and embedded microprocessor that enables a network connection (e.g., wireless) from a cloud server (that hosts a cloud application service) to the EMS visual light guidance aiding device and also enables a connection from a mobile device with a mobile app to enable the application on the EMS visual light guidance aiding device.

The various elements of the EMS visual light guidance aiding device of the present disclosure may be related in the following exemplary fashion. It is not intended to limit the scope or nature of the relationships between the various elements and the following examples are presented as illustrative examples only. The plastic casing (item #1) houses the EMS visual light guidance aiding device and may be approximately 6-8 inches in diameter and may provide the casing and foundation for all other components. The plastic casing (item #1) may be cylindrical with ribbed sections around the edges to project high-intensity strobe lights around and up each side of the plastic housing to approximately halfway around the plastic housing (semi-circle). The plastic casing (item #1) may have additional high-intensity lights, such as laser lights, facing and projecting skyward (e.g., on the top of the EMS visual light guidance aiding device) and another high-intensity light (or laser light) projecting toward the street/curb.

The plurality of high-intensity lights (item #2) may include two high-intensity laser lights. Those two laser lights are typically red in color. In some embodiments, one of the high-intensity laser lights is housed in the plastic casing (item #1) along a top surface of the EMS visual light guidance aiding device and projects skyward. The other high-intensity laser light may housed in another plastic casing (item #1) at the front face of the EMS visual light guidance aiding device to project outward toward the street/curb.

The plurality of strobe lights (item #3) includes at least six and up to eight high-intensity strobe lights. The strobe lights may be encased in the various plastic casings and complete a blinking pattern (strobe effect).

A small, but strong, magnet (item #4) may be attached to a backside surface of the EMS visual light guidance aiding device. The magnet (item #4) may be round in shape or have another shape suitable for various attachment options to a residence and/or structure.

The EMS visual light guidance aiding device may also have a hook hanger (item #5). In some embodiments, the hook hanger (item #5) may be a plastic hook (item #5) that is embedded in the housing of the EMS visual light guidance aiding device, but which can be retracted to provide another fastening option. In some embodiments, the hook hanger (item #5) may be attached to the backside surface of the housing for the EMS visual light guidance aiding device. In some embodiments, the EMS visual light guidance aiding device provides a plurality of hook hangers (item #5), either embedded/retractable or attached to the backside surface.

In addition to (or instead of) the magnet (item #4), the back of the plastic casing (item #1) may include one or more (optional) adhesive pad(s) (item #6) that provide strong peel adhesive for another fastening option.

The housing of the EMS visual light guidance aiding device may also provide a battery tray (item #7) in which to hold a battery or multiple batteries to power the device.

The EMS visual light guidance aiding device may also embed, inside the housing, electrical components (item #8) to communicate and interact with a mobile app, a cloud server, a cloud application service, etc., and wiring to power the electrical components (item #8).

The EMS visual light guidance aiding device of the present disclosure generally works by way of a mobile device with the appropriate mobile app installed. The mobile app can be used on a mobile device of the user to enable or disable the application for the EMS visual light guidance aiding device, at the user's discretion. The EMS visual light guidance aiding device itself would be affixed to the outside of a residence and/or building (or other exterior surface) and, when activated, the multiple light sources would illuminate making the residence and/or building extremely easy to locate visually without having to look (e.g., along the curb and/or on the residence/building itself) for the exterior address number of each residence. A user in an apartment building would affix the EMS visual light guidance aiding device to the exterior of the building and would also affix an additional light on their specific door jam within the apartment building. This allows EMS to visually look down a hallway and instantly identify the appropriate unit in need of emergency medical services. Activation of the EMS visual light guidance aiding device is possible when the user enables the mobile app and would generally occur whenever an emergency call is placed to '911'. Thus, when the EMS visual light guidance aiding device is activated, the following actions occur (simultaneously): a) the bottom half illuminates with high-intensity blinking red strobe lights; b) one of the red laser high-intensity light is projected outward and away from the residence and/or building toward the street or curb; c) a red laser high-intensity light is projected skyward to aid any type of air rescue assets (airplane/helicopter/drone); also, all of the above allows emergency personnel to visually locate the appropriate residence and/or building "at-a-glance" and from a distance which will provide a faster response time to an emergency scene and/or rescue.

To make the EMS visual light guidance aiding device of the present disclosure, the device would require assembling the components listed in a housing for the device with an app embedded in the device to work with both Android and iPhone devices. A possible additional add-on item would be a sound warning (i.e., siren) to provide an audible alert. The light configurations could be shuffled and placed in different locations along the housing. Multiple applications of the lights can be used in various settings (single family residence, apartment buildings, boats, cabins, and a miniature hand-held, or wrist band version for hikers and campers, etc.).

By way of example, FIG. 1 conceptually illustrates a perspective view of an EMS visual light guidance aiding device 100 configured to provide guidance to a specific location in some embodiments. As shown in this figure, the EMS visual light guidance aiding device 100 includes a plurality of domed light housing strips 110, each with a plurality of individual light domes and a plurality of high-intensity lights 120. Each high-intensity light 120 is enclosed within an individual light dome of a domed light housing strip 110. The plurality of high intensity lights 120 enclosed within the light domes of the domed light housing strip 110 along the top surface of the EMS visual light guidance aiding device 100 includes a red laser light that is configured to project laser light skyward during activation. Furthermore, the plurality of high intensity lights 120 enclosed within the light domes of at least one of the domed light housing strips 110 at the front facing surface of the EMS visual light guidance aiding device 100 includes a red laser light that is configured to project laser light outward toward a road or curb during activation.

The EMS visual light guidance aiding device 100 shown in this figure also includes a hanger hole 130, a communication device 140 and an application-enabled electronic system controller 150 (embedded within the EMS visual light guidance aiding device 100 and, therefore, shown in dashed outline), a plurality of audible alarms 160, a plurality of strobe lights 170, and a manual activation button 180 along a bottom surface of the EMS visual light guidance aiding device 100 (and, therefore, shown in dashed outline). Also, the EMS visual light guidance aiding device 100 is communicably connected, via the communication device 140, to a cloud server 190 that hosts a cloud application service. In some embodiments, the cloud server 190 and the cloud application service are operated by emergency services. In some embodiments, the cloud server 190 and the cloud application service are operated by another entity that notifies emergency services nearest to the location of the EMS visual light guidance aiding device 100.

Figure 2:
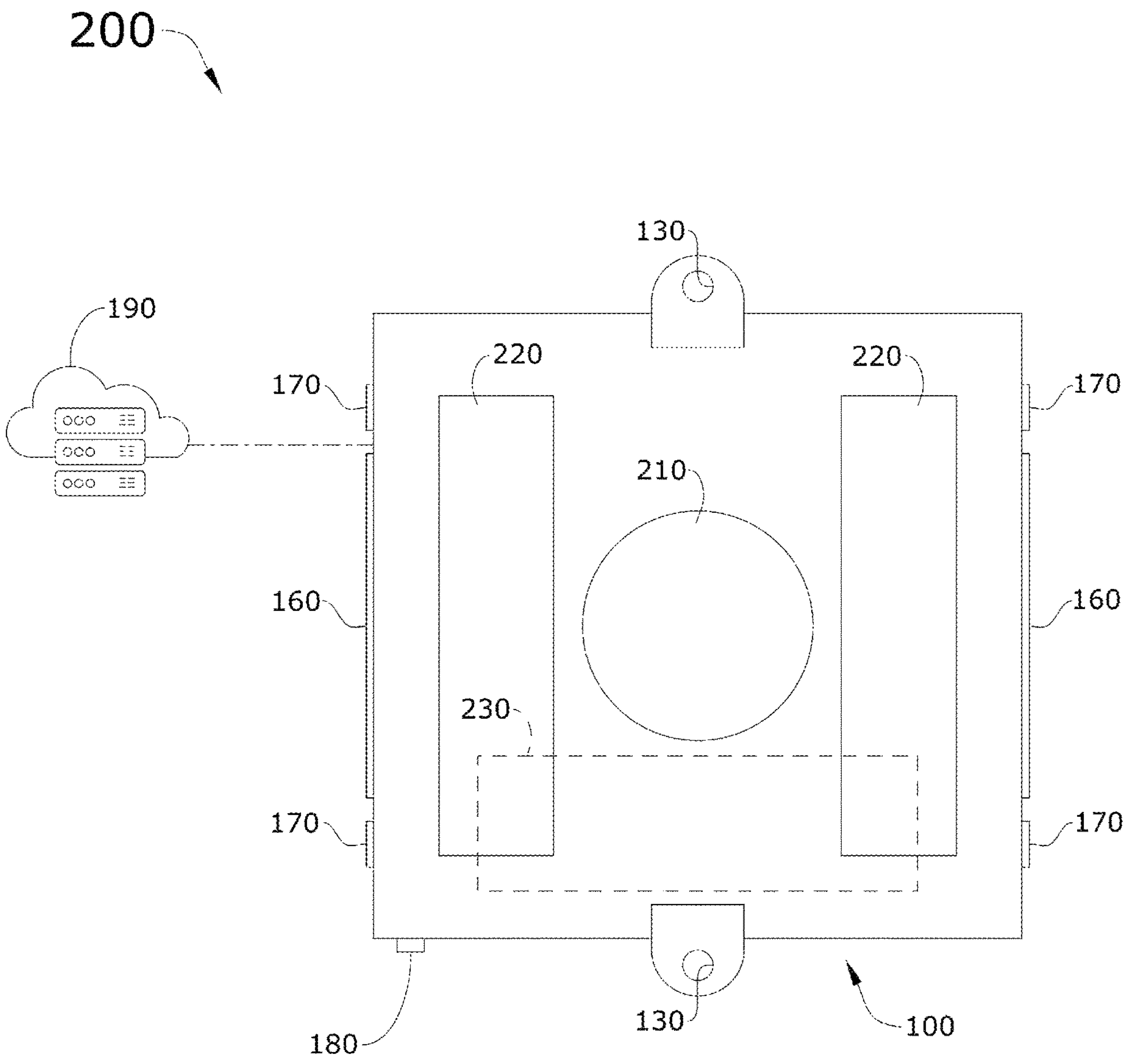
FIG. 2 conceptually illustrates a rear view of the fixed-location EMS visual light guidance aiding device in some embodiments.

Turning to another example, FIG. 2 conceptually illustrates a rear view of a backside 200 of the EMS visual light guidance aiding device 100 in some embodiments. From this rear view of the backside 200 of the EMS visual light guidance aiding device 100, additional components can be seen, namely, a strong magnet 210, a pair of adhesive pads 220, and an embedded battery 230. Furthermore, the EMS visual light guidance aiding device 100 is shown to have two hanger holes 16, one positioned at the top and the other positioned at the bottom. In addition to these features, several of the other components of the EMS visual light guidance aiding device 100 are shown including the plurality of audible alarms 160, the plurality of strobe lights 170, and the manual activation button 180 along the bottom surface of the EMS visual light guidance aiding device 100. As before, the EMS visual light guidance aiding device 100 is shown making a wireless network connection to the cloud server 190 that hosts the cloud application service.

To use the EMS visual light guidance aiding device of the present disclosure, there are typically two users. The first user is an individual requesting emergency services and help, the second is an EMS personnel. Assuming an EMS visual light guidance aiding device is installed at the first user's residence or other specific location, the first user would activate the lights of the EMS visual light guidance aiding device automatically when dialing '911' from their mobile device. While there is an option to activate/deactivate the EMS visual light guidance aiding device when calling '911', this option is for a specific scenario when the first user is not at their own residence (location of their EMS visual light guidance aiding device). For example, the first user may need to dial '911' from a location other than their residence (i.e., in their car, on the street, at the residence of a friend or relative, etc.) and would not want to direct EMS personnel to the location of their own EMS visual light guidance aiding device. Nevertheless, assuming the first user calls '911' from the location of the EMS visual light guidance aiding device, then the second user (who would typically be a first responder, such as a professional EMS worker, EMT, police, fire, ambulance, ranger, or other emergency personnel) would be able to visually locate the residence of the first user because the EMS visual light guidance aiding device would have been activated. This would enable the second user to visually locate the residence from a significant distance away (specifics depend on road curvature, weather/fog, etc.) while driving in the direction of the known address. Today, EMS must search for the exact address by looking at each house number or the address along the curb and, in many instances, have "passed up" the intended residence only to have to double-back. The EMS visual light guidance aiding device eliminates this problem.

Figure 3:
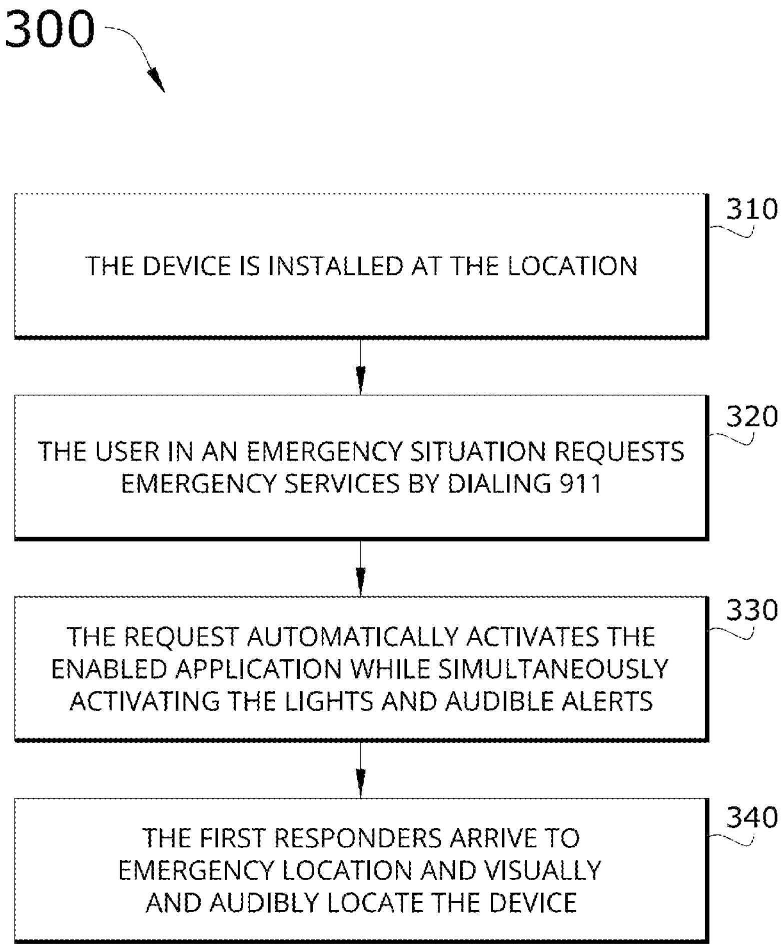
FIG. 3 conceptually illustrates a process for using a fixed-location EMS visual light guidance aiding device to aid first responders in finding and arriving at a specific location of a person in an emergency situation in some embodiments.

By way of example, FIG. 3 conceptually illustrates a process for using the EMS visual light guidance aiding device to aid first responders in finding and arriving at a specific location of a person in an emergency situation 300. As shown in this figure, the process for using the EMS visual light guidance aiding device to aid first responders in finding and arriving at a specific location of a person in an emergency situation 300 starts with installation of the EMS visual light guidance aiding device at a specific location (at 310), such as the user's residence. To ensure that automatic activation of the EMS visual light guidance aiding device occurs during an emergency situation, the user would also 'enable' the application for the EMS visual light guidance aiding device. The user could, for example, enable the application on the EMS visual light guidance aiding device by using a mobile app on a mobile device and making a connection to the EMS visual light guidance aiding device and selecting an option to 'enable' the EMS visual light guidance aiding device. The connection by the mobile device may involve a wireless connection to the communication device 140 (and by extension, to the electronic system controller 150 to which the communication device 140 is assembled) of the EMS visual light guidance aiding device. When the user selects the option to 'enable' the EMS visual light guidance aiding device, the mobile app/mobile device sends out a corresponding command that is received at the communication device 140 of the EMS visual light guidance aiding device. The embedded electronic system controller 150 receives the 'enable' command from the communication device 140 and performs an operation to enable the EMS visual light guidance aiding device. In some embodiments, the embedded electronic system controller 150 stores an emergency output program (as an embedded application) which signals the individual components of the EMS visual light guidance aiding device to provide the visible light and audible sounds as emergency output. However, this occurs if the EMS visual light guidance aiding device is enabled and only when the user dials '911' and requests emergency services, which is described next.

Specifically, the next step of the process involves the user dialing '911' and requesting emergency services (at 320). In this case, the user or another person at the user's residence may be in an emergency situation. For example, by dialing '911' on the user's mobile device, the EMS visual light guidance aiding device triggers automatic activation of the emergency output program. Similarly, the user can call '911' from another phone that is configured to trigger the EMS visual light guidance aiding device, or the EMS visual light guidance aiding device can be activated remotely by the '911' emergency services via the cloud server 190. Any such mechanism for activating the EMS visual light guidance aiding device 100 is supported. Thus, the user's action of dialing '911' and requesting the emergency services automatically activates (at 330) the application on the embedded electronic system controller 150 of the EMS visual light guidance aiding device 100. This is of course dependent upon the user having previously enabled the EMS visual light guidance aiding device 100. Once activated, the embedded application on the EMS visual light guidance aiding device 100 automatically and simultaneously triggers activation of the lights and audible output devices.

During the final step of the process for using the EMS visual light guidance aiding device to aid first responders in finding and arriving at a specific location of a person in an emergency situation 300, first responders visually (and possibly audibly) navigate to the location of the EMS visual light guidance aiding device (at 340) and, upon arriving at the site of the EMS visual light guidance aiding device, handle the emergency situation.

While this example demonstrates how the EMS visual light guidance aiding device 100 gets installed, enabled, and activated, there is another option for manual activation of the EMS visual light guidance aiding device 100. This simply involves the user pressing the manual activation button 180 along the bottom surface of the EMS visual light guidance aiding device 100. By pressing the manual activation button 180, the embedded electronic system controller 150 is triggered to activate the application for the EMS visual light guidance aiding device 100. In some embodiments, the manual activation button 180 needs to be pressed and held for a duration of time before the embedded electronic system controller 150 triggers activation of the application for the EMS visual light guidance aiding device 100. For example, pressing and holding the manual activation button 180 for a minimum of three seconds which, upon expiration of that time duration, sends a manual override signal to the embedded electronic system controller 150 to trigger activation of the application on the EMS visual light guidance aiding device 100. A timed duration for pressing and holding the manual activation button 180 would help prevent false alarms by accidental or unintentional pressing of the button 180. Also, in some embodiments, the application that gets activated by the embedded electronic system controller 150 is configured to automatically notify emergency services of an emergency situation at the location of the EMS visual light guidance aiding device 100 when the manual activation button 180 is pressed (and held pressed for any required time duration). The notification to emergency services would be needed in this case because the manual pressing of the manual activation button 180 is possible even without phone communication to emergency services (e.g., as would normally be possible by dialing '911'). For example, the user's mobile device is out of charge, so the user cannot make calls to '911' and needs to manually activate the EMS visual light guidance aiding device 100 by pressing the manual activation button 180.

While the examples described above pertain to emergency situations in which the EMS visual light guidance aiding device 100 is fixed to a particular location, the functioning of the EMS visual light guidance aiding device can also be carried out in an alternate, mobile form, which is described next, by reference to FIG. 4.

Figure 4:
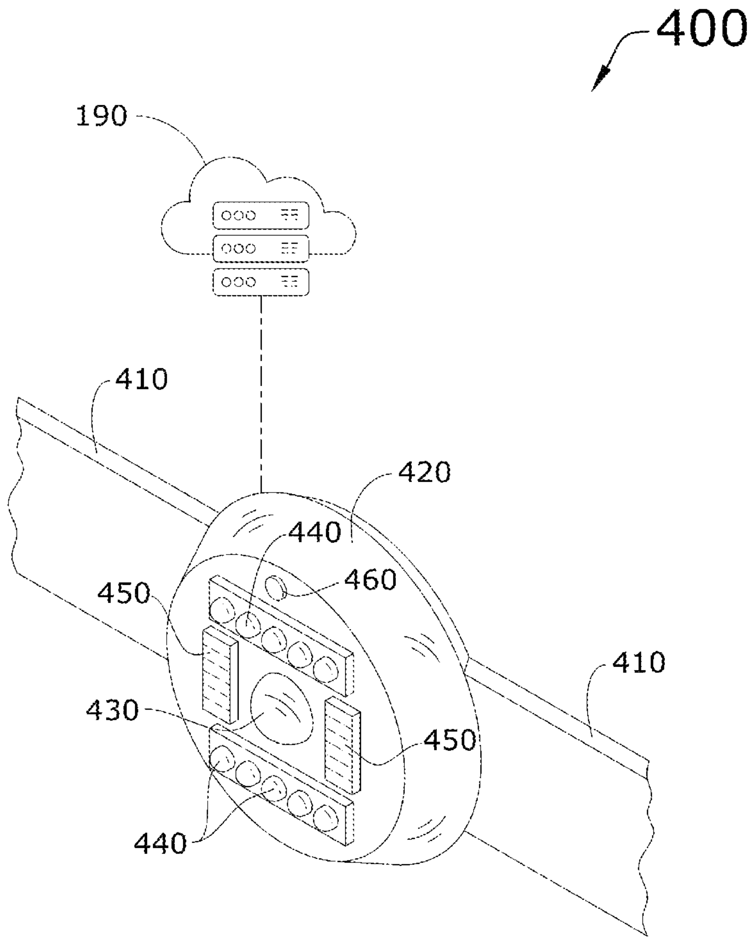
FIG. 4 conceptually illustrates a perspective view of an alternate embodiment of a mobile, wearable EMS visual light guidance aiding device configured to provide guidance to a specific location of a mobile person.

Specifically, FIG. 4 conceptually illustrates a perspective view of an alternate embodiment of a mobile, wearable EMS visual light guidance aiding device 400 that is configured to provide guidance to a specific location of a person wearing the mobile, wearable EMS visual light guidance aiding device 400. The person may be hiking, biking, jogging, or otherwise moving about. In this case, the mobile, wearable EMS visual light guidance aiding device 400 is easy for the person to carry, since it can be designed/formed in any of several wearable manners.

As shown in this figure, the mobile, wearable EMS visual light guidance aiding device 400 comprises a pair of straps 410, a reflective face 420, a strobe light 430, a plurality of high-intensity lights 440, a plurality of audible alarms 450, and a manual activation button 460. Although not shown in this figure, the mobile, wearable EMS visual light guidance aiding device 400 also includes an embedded communication device, an embedded application-enabled electronic system controller, and a battery. Also, the mobile, wearable EMS visual light guidance aiding device 400 is shown in connection with the cloud server 190 and cloud application service.

In some embodiments, the pair of straps 410 are configured to wrap around a body part of a person to allow the person to wear the mobile, wearable EMS visual light guidance aiding device 400. The pair of straps 410 may be wrist straps, waist straps, leg straps, or other types of straps that allow the person to wear the mobile, wearable EMS visual light guidance aiding device 400. For example, the mobile, wearable EMS visual light guidance aiding device 400 may be designed as a wrist device and the pair of (wrist) straps 410 wrap around the wrist of the person, or may be designed as a waist device and the pair of (waist) straps 410 wrap around the waist of the person.

In some embodiments, the reflective face 420 is highly reflective being a mirrored front surface or other reflective surface that is highly reflective. The reflective face 420 is useful for reflecting back light, such as may be illuminated by emergency personnel on the lookout for the person during an emergency situation. For example, a helicopter shining a bright light down to the ground in search of the person—in which case the person can orient the mobile, wearable EMS visual light guidance aiding device 400 in a way that reflects the light back up to the helicopter, to provide a visual signal as to the person's location. Since the mobile, wearable EMS visual light guidance aiding device 400 also includes a manual activation button 460, the person could press it to activate the strobe light 430, the plurality of high-intensity lights 440, and the plurality of audible alarms 450 while orienting the mobile, wearable EMS visual light guidance aiding device 400 so as to signal to the emergency services. For example, orienting upward toward the helicopter or orienting it outward in a direction in which emergency services appear to be approaching or nearby the person (where orienting outward would typically be best in a way that the lights (such as laser lights) shin more or less parallel to the ground surface nearby the person.

Adding to this functionality, a wireless signal is transmitted to the cloud server 190 and cloud application service when the person presses the manual activation button 460 to trigger activation of the mobile, wearable EMS visual light guidance aiding device 400. In some embodiments, the cloud server 190 and the cloud application service are operated by emergency services. In some embodiments, the cloud server 190 and the cloud application service are operated by another entity that notifies emergency services nearby the position of the person. The wireless signal transmitted to the cloud server 190 is a distress signal and the transmitted data includes distress data (e.g., "SOS") and unique identifying data for the mobile, wearable EMS visual light guidance aiding device 400. In some embodiments, the data transmitted to the cloud server 190 also includes location data associated with a relative geo-spatial position of the person and the mobile, wearable EMS visual light guidance aiding device 400. In some embodiments, the geo-spatial position is determined based on GPS data from an onboard GPS module of the mobile, wearable EMS visual light guidance aiding device 400. In some embodiments, the geo-spatial position is determined based on GPS data from a communicably connect mobile device of the person which has its own GPS module.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
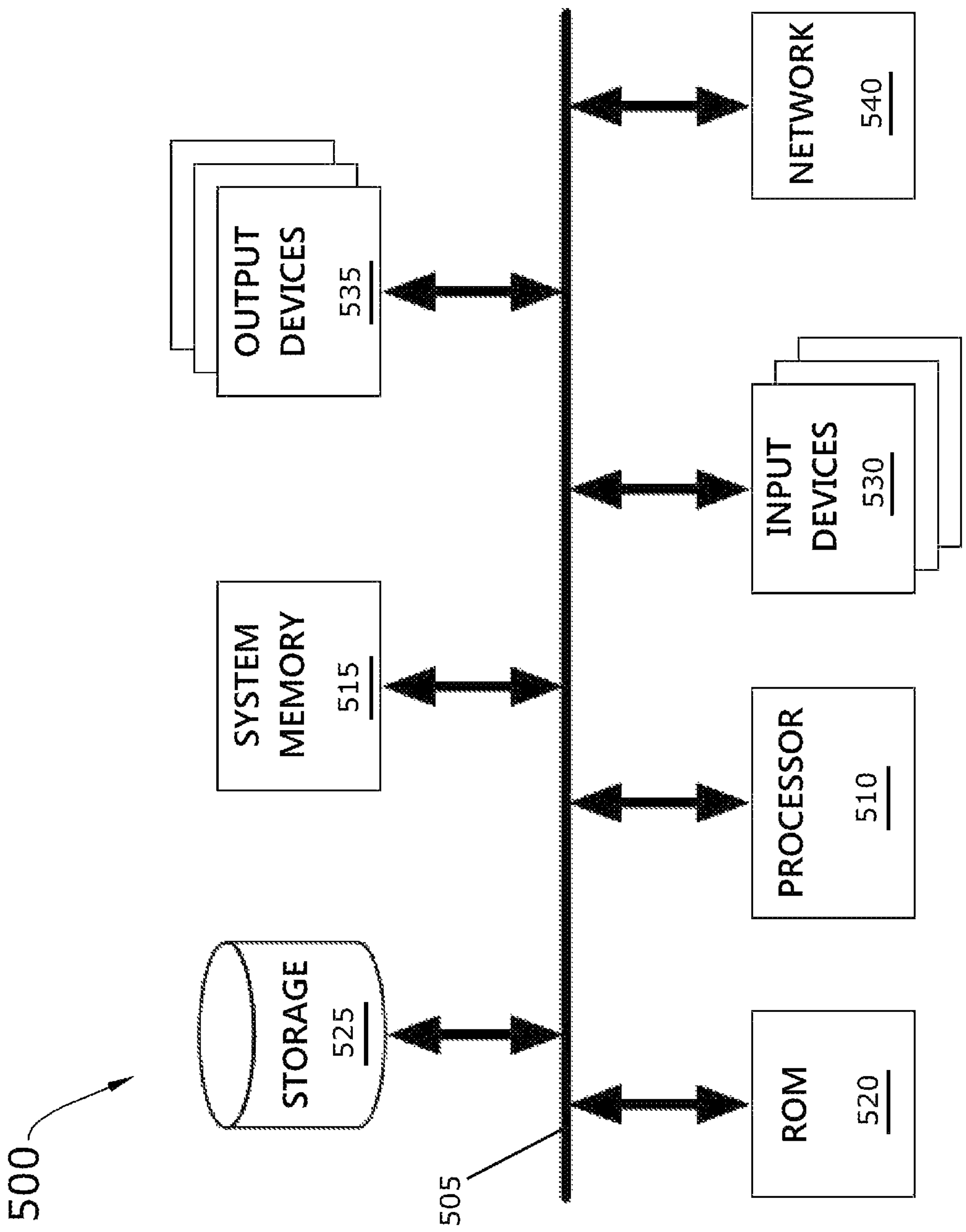
FIG. 5 conceptually illustrates an electronic system with which some embodiments of the invention are implemented.

By way of example, FIG. 5 conceptually illustrates an electronic system 500 with which some embodiments of the invention are implemented. The electronic system 500 may be a single board computer (SBC) or other control unit that is capable of running the embedded application on the fixed-location EMS visual light guidance aiding device or the mobile, wearable EMS visual light guidance aiding device when triggered to activate during an emergency situation. Thus, the electronic system controller 150 described above, by reference to FIG. 1, demonstrates one example of an electronic system 500 embedded in the EMS visual light guidance aiding device, but may be represented by any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the embedded application on the fixed-location EMS visual light guidance aiding device or the mobile, wearable EMS visual light guidance aiding device. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a flash drive or memory card) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards of connected mobile devices or the manual activation button. The output devices 535 display light and output sounds (alarms) generated by the electronic system 500. The output devices 535 include the high-intensity lights, laser lights, strobe lights, audible alert devices, etc.

Finally, as shown in FIG. 5, bus 505 also couples electronic system 500 to a network 540 through a network adapter (such that provided through the communication device 140, described above by reference to FIG. 1). In this manner, the electronic system 500 is able to connect the EMS visual light guidance aiding device or the mobile, wearable EMS visual light guidance aiding device to a network of computers (such as a local area network ("LAN"), a wide area network ("WAN"), or an intranet), or a network of networks (such as a cellular or mobile data communications network). Thus, any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 3 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes (e.g., in the process 300, described above by reference to FIG. 3, the initial step of installing the device may occur once for a person, but steps 320-340 can be repeated by the person for several different emergency situations), or as part of a larger macro process. Thus, one of ordinary skill in the art would understand that the invention is not to be limited by the foregoing illustrative details, but rather is to be defined by the appended claims.

We claim:

1. A fixed-location emergency medical services (EMS) visual light guidance aiding device to aid first responders in guidance to a specific location, the EMS visual light guidance aiding device comprising:

a domed light housing;

a plurality of high-intensity lights encapsulated within the domed light housing that are configured to shine brightly during an emergency;

a plurality of strobe lights that are configured to flash light during the emergency;

a fastener configured to attach to a surface of an object at a particular location of a user, wherein the object comprises an electrical power source;

a wired power line connection to the electrical power source of the object at the particular location;

an embedded application-enabled electronic system controller and an embedded communication device that are powered by the power source via the wired power line connection and communicably connected to a cloud server that hosts a cloud application service for emergency services, wherein the embedded application-enabled electronic system controller is configured to (i) wirelessly communicate, via the embedded communication device, with a mobile application that runs on a mobile device of the user and, when the fixed-location EMS visual light guidance aiding device is enabled by the user through the mobile application, (ii) activate during an emergency situation when the user dials '911' for an emergency situation at the particular location, and (iii) transmit an emergency alert, via the embedded communication device, to the cloud application service to inform emergency services of the emergency situation at the particular location; and a manual activation button that is configured to trigger the embedded application-enabled electronic system controller to transmit emergency alerts, via the embedded communication device, to the cloud application service when depressed and held for a duration of time to alert emergency services of the emergency situation at the particular location.

2. The fixed-location EMS visual light guidance aiding device of claim 1, wherein the domed light housing comprises a plurality of individual light domes, wherein each high-intensity light is encapsulated within an individual light dome of the domed light housing.

3. The fixed-location EMS visual light guidance aiding device of claim 1, wherein the fastener comprises at least one of a single hanger hole, a plurality of hanger holes, and a strong magnet.

4. The fixed-location EMS visual light guidance aiding device of claim 1, wherein the object at the particular location comprises a residential structure and the surface comprises an exterior wall of the residential structure.

5. The fixed-location EMS visual light guidance aiding device of claim 1 further comprising a pair of adhesive pads.

6. The fixed-location EMS visual light guidance aiding device of claim 1, wherein the plurality of high-intensity lights comprises a plurality of laser lights.

7. The fixed-location EMS visual light guidance aiding device of claim 6, wherein the plurality of laser lights comprises a first red laser light that is oriented in a lateral direction toward a curb nearby the particular location and a second red laser light that is oriented in a skyward direction.

8. The fixed-location EMS visual light guidance aiding device of claim 1 further comprising a plurality of audible alarms that are configured to output loud audio alerts during the emergency.

* * * * *